(12) United States Patent
Kawalec

(10) Patent No.: US 9,416,549 B2
(45) Date of Patent: Aug. 16, 2016

(54) BASEBOARD

(71) Applicant: DECORA SPÓŁKA AKCYJNA, Środa Wielkoplska (PL)

(72) Inventor: Adrian Kawalec, Lubsza (PL)

(73) Assignee: DECORA SPOLKA AKCYJNA, Sroda Wielkoplska (PL)

( * ) Notice: Subject to any disclaimer, the term of this patent is extended or adjusted under 35 U.S.C. 154(b) by 0 days.

(21) Appl. No.: 14/781,228

(22) PCT Filed: Mar. 26, 2014

(86) PCT No.: PCT/PL2014/050015
§ 371 (c)(1),
(2) Date: Sep. 29, 2015

(87) PCT Pub. No.: WO2014/158041
PCT Pub. Date: Oct. 2, 2014

(65) Prior Publication Data
US 2016/0053500 A1 Feb. 25, 2016

(30) Foreign Application Priority Data
Mar. 29, 2013 (PL) .................................... 121889 U

(51) Int. Cl.
*E04C 2/38* (2006.01)
*E04F 19/04* (2006.01)
*H02G 3/04* (2006.01)

(52) U.S. Cl.
CPC .......... *E04F 19/0463* (2013.01); *H02G 3/0425* (2013.01); *E04F 2019/044* (2013.01); *E04F 2019/0422* (2013.01)

(58) Field of Classification Search
CPC . E04F 19/02; E04F 19/0463; E04F 2019/044; E04F 19/0468; E04F 19/045; E04F 2019/0413; E06B 1/68; E06B 1/62; H02G 3/0425; A47F 5/08

USPC ........................................................ 52/718.04
See application file for complete search history.

(56) References Cited

U.S. PATENT DOCUMENTS 4,165,577 A * 8/1979 Shanahan ............. A01M 1/223
43/112
5,224,610 A * 7/1993 Veazey .................. A47F 5/0846
211/162

(Continued)

FOREIGN PATENT DOCUMENTS

DE 91 03 263 U1 6/1991
DE 101 07 866 A1 9/2001

(Continued)

OTHER PUBLICATIONS

Jul. 8, 2014 Search Report issued in International Patent Application No. PCT/PL2014/050015.

(Continued)

*Primary Examiner* — Brian Mattei
(74) *Attorney, Agent, or Firm* — Oliff PLC

(57) ABSTRACT

A baseboard having an installation section and a cover section. Included are a bottom shelf, a middle shelf, and a top shelf expanding from its surface in the same direction. The end of the bottom shelf is bent towards the middle shelf. The middle shelf is bent in a part of its width towards the top shelf and, in a larger part of its width, the middle shelf is bent towards the bottom shelf, while the top shelf is bent in a part of its width towards the middle shelf and, in a larger part of its width, the top shelf is bent out upwards. The external surfaces of the bent sections of the ends of the bottom shelf and of the top shelf form a flexible lock. The elements of the mounting part and the cover part form a top chamber and a bottom chamber.

4 Claims, 4 Drawing Sheets

(56) References Cited

U.S. PATENT DOCUMENTS

| | | | | |
|---|---|---|---|---|
| 5,274,972 | A * | 1/1994 | Hansen | E04F 17/08 174/504 |
| 6,786,016 | B1 * | 9/2004 | Wood | A01M 1/2011 43/107 |
| 2002/0112423 | A1 * | 8/2002 | Schiedegger | E04F 19/02 52/211 |
| 2003/0140583 | A1 * | 7/2003 | Sauter | E04F 19/0468 52/220.7 |
| 2008/0202049 | A1 * | 8/2008 | Galas | E04F 19/0463 52/288.1 |
| 2011/0179733 | A1 * | 7/2011 | Picken | E04F 19/02 52/242 |

FOREIGN PATENT DOCUMENTS

| | | |
|---|---|---|
| DE | 20 2007 002 815 U1 | 5/2007 |
| FR | 2 605 663 A1 | 4/1988 |
| GB | 1 574 827 A | 9/1980 |
| PL | 63142 Y1 | 5/2007 |
| PL | 64627 Y1 | 10/2009 |
| PL | 64722 Y1 | 12/2009 |
| PL | 65101 Y1 | 9/2010 |

OTHER PUBLICATIONS

Jul. 8, 2014 Written Opinion issued in International Patent Application No. PCT/PL2014/050015.

* cited by examiner

BASEBOARD

The invention relates to a baseboard intended for covering wall-floor transition spots, what is of key importance in cases of irregularities, most frequently occurring in such spots, and beside this, the baseboard according to the invention should perform to a limited degree a function of a duct for electrical cables running along the wall, at a small distance from the floor.

From a Polish description of the utility model No. Ru 63142, a baseboard is known, consisting of a base profile and a cover profile connected with the base profile. The base profile has a trapezoidal shape and is equipped with an arm with an external tip, the arm being bent outwards. From the side of the longer open base, the base profile has a constriction defined by two slanting surfaces. There is a series of through holes in the bottom wall of the profile. The cover profile has a long arm and an angularly bent short arm, connected with the long arm archwise. At the second tip of the long arm, at the internal side of the cover profile, two protruding mounting ribs are located, with external walls having bulges interpenetrating the shape edges of the base profile. During installation of the board, the cover profile is fixed in the base profile using the mounting ribs, with their external bulges forming a snap-on connection with the slanting surfaces of the base profile. After installation of the board, the long arm of the cover profile is positioned in a line with the outward bent arm of the base profile and constitutes its extension. Both bent arms cover spaces in which electrical or telephone cables may be placed. The base profile and the cover profile are made of plastic by extrusion moulding and they are covered with a decorative laminate. The base profile may be glued to the wall or screwed on. The fixing method varies depending on the type of the material of the wall.

From a Polish description of the utility model no. Ru 64627, a design of a one-piece board is known, in which a tilting cover part of the external board is connected flexibly with a mounting internal part of the board in a shape close to that of a channel section, and the mounting internal part of the board has a support with a shape of a protrusion in the place of the flexible connection with the tilting cover part of the external board. The internal part of the board is connected with the mounting internal part of the board by a snap fastener, consisting of a snap fastener socket and a snap fastener slide with a grooved working surface, moreover, the baseboard is terminated with flexible tips. The utility model comprises eight forms of the baseboard. In the first form of the baseboard according to the utility model, the flexible connection of the tilting cover part of the external board with the mounting internal part of the board is located in the bottom section of the board and the mounting internal part of the board with the shape close to that of a channel section has a folding back surface, while the support with the shape of a protrusion is located in the bottom internal section of the internal mounting board, the tip of the top section of this board is the slide of the snap fastener, and the socket of the snap fastener is positioned in the top section of the internal surface of the tilting cover part of the external board and it has a shape of a two-piece protrusion, with one element having a grooved working surface, while the other element has a shape close to a hook. In the second form of the baseboard according to the utility model, the flexible connection of the tilting cover part of the external board with the mounting internal part of the board is located in the top section of the board and the mounting internal part of the board with the shape close to that of a channel section has a folding back surface, while the support with the shape of a protrusion is located in the top internal mounting part of the internal board, the tip of the bottom section of this board is the slide of the snap fastener and the socket of the snap fastener is positioned in the bottom section of the internal surface of the tilting cover part of the external board and it has a shape of a two-piece protrusion, with one element having a grooved working surface, while the other element has a shape close to a hook. In the third form of the baseboard according to the utility model, the flexible connection of the tilting cover part of the external board with the mounting internal part of the board is located in the bottom section of the board and the mounting internal part of the board with the shape close to that of a channel section has a folding back surface. The support with the shape of a protrusion is positioned in the bottom internal section of the internal mounting board. The socket of the snap fastener is located in the top internal section on the mounting part of the internal board and it has a shape of a one-piece protrusion with a grooved working surface. The tip of the top tilting cover part of the external board constitutes the slide of the snap fastener. In the fourth form of the baseboard according to the utility model, the flexible connection of the tilting cover part of the external board with the mounting internal part of the board is located in the top section of the board and the mounting part of the internal board with the shape close to that of a channel section has a folding back surface, while the support with the shape of a protrusion is located in the top internal section of the internal mounting board and the socket of the snap fastener is positioned in the bottom internal section on the mounting part of the internal board and it has a shape of a one-piece protrusion with a grooved working surface, and the tip of the bottom tilting cover part of the external board is the slide of the snap fastener. In the fifth form of the baseboard according to the utility model, the flexible connection of the tilting cover part of the external board with the mounting internal part of the board is located in the bottom section of the board, and the mounting internal part of the board with the shape close to that of a channel section has a smooth back surface. The support with the shape of a protrusion is located in the bottom internal section of the internal mounting board, the tip of the top section of this board is the slide of the snap fastener, and the socket of the snap fastener is positioned in the top section of the internal surface of the tilting cover part of the external board and it has a shape of a two-piece protrusion, with one element having a grooved working surface, while the other element has a shape close to a hook. In the sixth form of the baseboard according to the utility model, the flexible connection of the tilting cover part of the external board with the mounting internal part of the board is located in the top section of the board and the mounting internal part of the board with the shape close to that of a channel section has a smooth back surface, while the support with the shape of a protrusion is located in the top internal mounting part of the internal board, the tip of the bottom section of this board is the slide of the snap fastener and the socket of the snap fastener is positioned in the bottom section of the internal surface of the tilting cover part of the external board and it has a shape of a two-piece protrusion, with one element having a grooved working surface, while the other element has a shape close to a hook. In the seventh form of the baseboard according to the utility model, the flexible connection of the tilting cover part of the external board with the mounting internal part of the board is located in the bottom section of the board, and the mounting internal part of the board with the shape close to that of a channel section has a smooth back surface, while the support with the shape of a protrusion is located in the bottom internal section of the internal mounting board, and the socket of the snap fastener is positioned in the top internal section on the mounting part of the internal board and it has a shape of a one-piece protrusion with a grooved working surface and the tip of the top tilting cover part of the external board is the slide of the snap fastener. In the eighth form of the baseboard according to the utility model, the flexible connection of the tilting cover part of the external board with the mounting internal part of the board is located in the top section of the board and the mounting part of the internal board with the shape close to that of a channel section has a smooth back surface, while the support with the shape of a protrusion is located in the top internal section of the internal mounting board and the socket of the snap fastener is positioned in the bottom internal section on the mounting part of the internal board and it has a shape of a one-piece protrusion with a grooved working surface and the tip of the bottom tilting cover part of the external board is the slide of the snap fastener.

From a Polish description of the utility model No. Ru 64722 a baseboard is known, comprised of two longitudinal parts disjunctively connected, where the bottom shape has a horizontal bottom board, connected by one edge with a slanting bottom profile surface and a flexible bottom strip is placed on the connection. On the top edge of the bottom profile surface, a rectangular offset is formed, while above it, a tray is located, having a vertical bottom wall and horizontal lower and upper walls, while the lower wall has an edge bent inwards and formed as a notch connecting with the offset of the bottom profile surface and in the upper wall, its outer edge has a bulge with a cross-sectional shape of an open "u". The upper wall is shorter than the lower wall. The top shape constitutes the top profile surface having a shape close to flat at the bottom and at the top—a shape cylindrically bent, moreover at the bottom, near the lower edge, a straight protrusion is formed perpendicularly, in the form of a board bent slightly out downwards in the centre, while above it, also at the bottom, near the centre of the top profile surface, a rectangular snap protrusion is located, constituting a board with a bulge formed on its external surface, the bulge cross-section resembling a flipped "v". A flexible top strip is located on the extreme edge of the cylindrical section of the top profile surface. The bottom edge of the top profile surface matches the offset of the bottom profile surface and the straight protrusion matches the notch of the bottom tray's wall. When the profiles are connected, the bulge of the top tray's wall is matched and contacts with the bulge formed on the snap protrusion of the top profile surface. The baseboard according to the utility model has a horizontal surface formed in the bottom section, the surface preventing spontaneous sliding of the baseboard to the floor during its installation on the wall but it remains in a fixed position. The top section of the board has two catches of various shapes on the bottom, where the bottom catch is shaped so that it does not contact the optional cable placed near it. Moreover, on the ends of the face surfaces of both sections of the board, flexible strips are formed, which after installation of the board, fit exactly to the shapes of the wall and floor, concealing all irregularities.

From a Polish description of the utility model No. Ru 65101, a baseboard is known, composed of two mating elements, while the first element is a mounting-cover element, and the other element is a cover element. The mounting-cover element has a cross-section with a shape close to letter "l" fixed to the wall by its vertical section and equipped with snap protrusions. The first protrusion is positioned on the top edge and it is bent out upwards with an end having a shape of a widely open "v". The second protrusion is positioned approximately at two thirds of the height measured from the top of the element and it has an end having a shape of a flipped widely open "v". A first installation chamber is formed between them. A second installation chamber forms between the second protrusion and the bottom section of this element, the section having a semicircular cross-section. The cover part with a deflection in the middle, shaped by radius R 12, is connected via a bulge to the bottom section of the element. On the bulge, a rectangular protrusion is positioned, separated from the bulge's edge by a distance equal to the thickness of the cover element's wall. The cover element has a skid-shaped cross-section, with a bend shaped by radius R 15, equipped with snap protrusions positioned so as to mate the first and second protrusion of the mounting-cover element, respectively, the first protrusion having an end with the shape of a flipped widely open "v", and the second one—with a shape of a widely open "v". The end of the cover section of the mounting-cover element and the cover element may be terminated with a flexible tip in the form of an arrow-head.

The aim of the construction according to the invention is to provide a solution enabling an extension of the design's functionality, which improves the possibilities to facilitate the processes of installation of the board on the wall and painting of the walls or wallpaper-hanging without a necessity to uninstall the board.

The essence of the baseboard, which, according to the invention, is composed of snap-connected installation and cover sections, with walls forming the internal installation chamber, is characterised in that the installation section is constituted by a profile in the form of a flat board from the surface of which a bottom shelf, a middle shelf and a top shelf expands in the same direction, while the end of the bottom shelf is bent out towards the middle shelf, while the middle shelf is bent in a small part of its width towards the top shelf and then, in a slightly larger part of its width, the middle shelf is bent out towards the bottom shelf, moreover, the top shelf is bent in a small part of its width towards the middle shelf and then, in a slightly larger part of its width, the top shelf is bent out upwards. The cover section is constituted by a profile in the form of a board, with a cross-section resembling a flipped "L" with small sections of shelves bent outwards. The bottom shelf and a top shelf expand in the same direction from the central part of the cover part's surface. The bottom shelf is bent out downwards in a small part of its width and then, in a slightly larger part of its width, the bottom shelf is bent towards the top shelf. The top shelf is bent out upwards in a small part of its width and then, in a slightly larger part of its width, the top shelf is bent towards the bottom shelf. The external surfaces of the bent sections of the ends of the bottom shelf and of the top shelf form a flexible lock by abutting to the internal surfaces of the bent sections of the ends of the middle shelf and of the top shelf, furthermore the elements of the mounting part and the elements of the cover part form a top chamber and a bottom chamber. According to another favourable feature of the invention, the wall of the mounting part has a repeating series of holes with various sizes and outlines in the width between the middle shelf and the top shelf, the series forming the first openwork. According to another favourable feature of the invention, the wall of the mounting part has a series of holes in the width between the middle shelf and the bottom shelf, the series forming the second openwork. According to another favourable feature of the invention, the end of the bottom shelf bent out towards the middle shelf, is located in a plane parallel to the plane of the surface of the cover part.

A favourable effect of utilisation of a design according to the invention consists in a facilitation of painting of the walls or wallpaper-hanging without a necessity to uninstall the board—being particularly important in cases of a previous installation of electrical cables in the hollow of the board.

BRIEF DESCRIPTION OF THE DRAWINGS

The invention will be explained more precisely using drawings.

DETAILED DESCRIPTION

Figure 1:
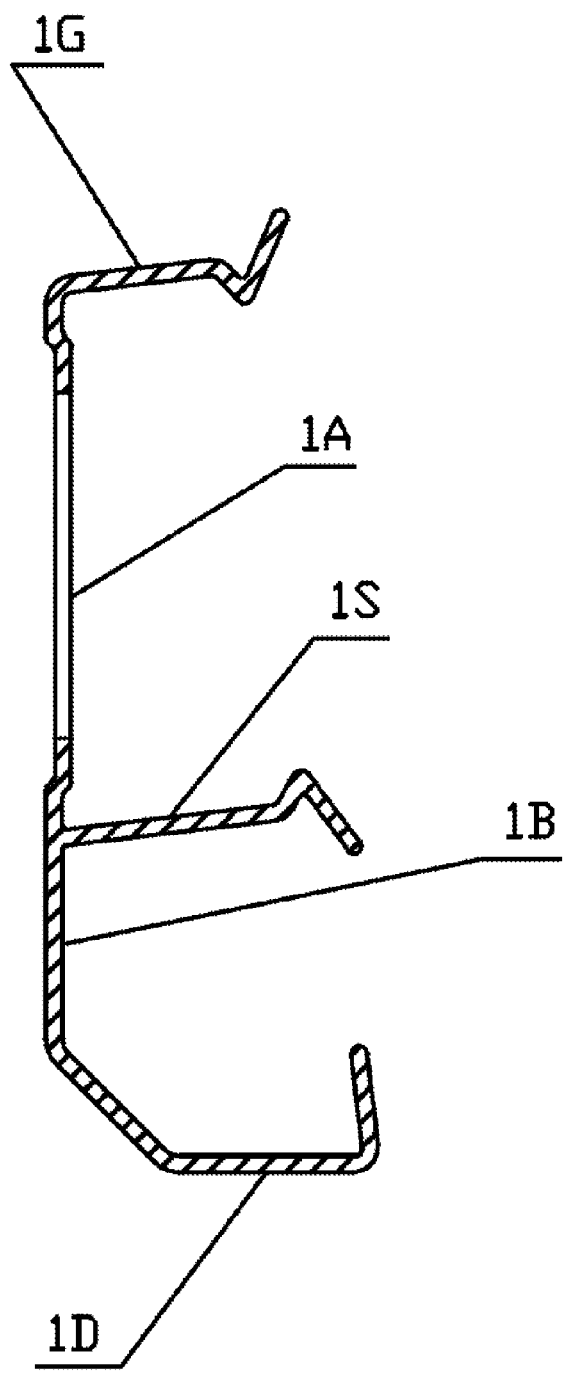
FIG. 1 shows a cross-section of the baseboard.
Figure 2:
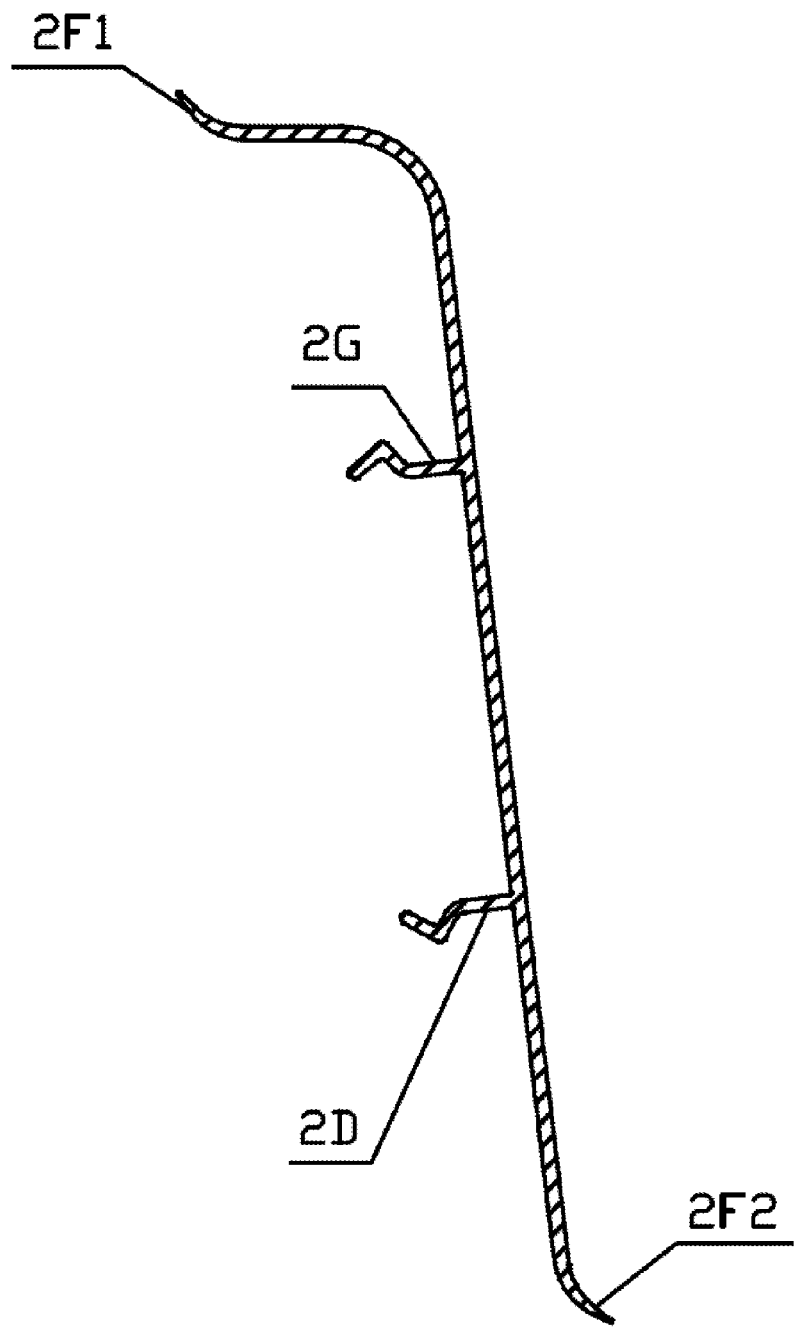
FIG. 2 a cross-section of a cover section of the baseboard.
Figure 3:
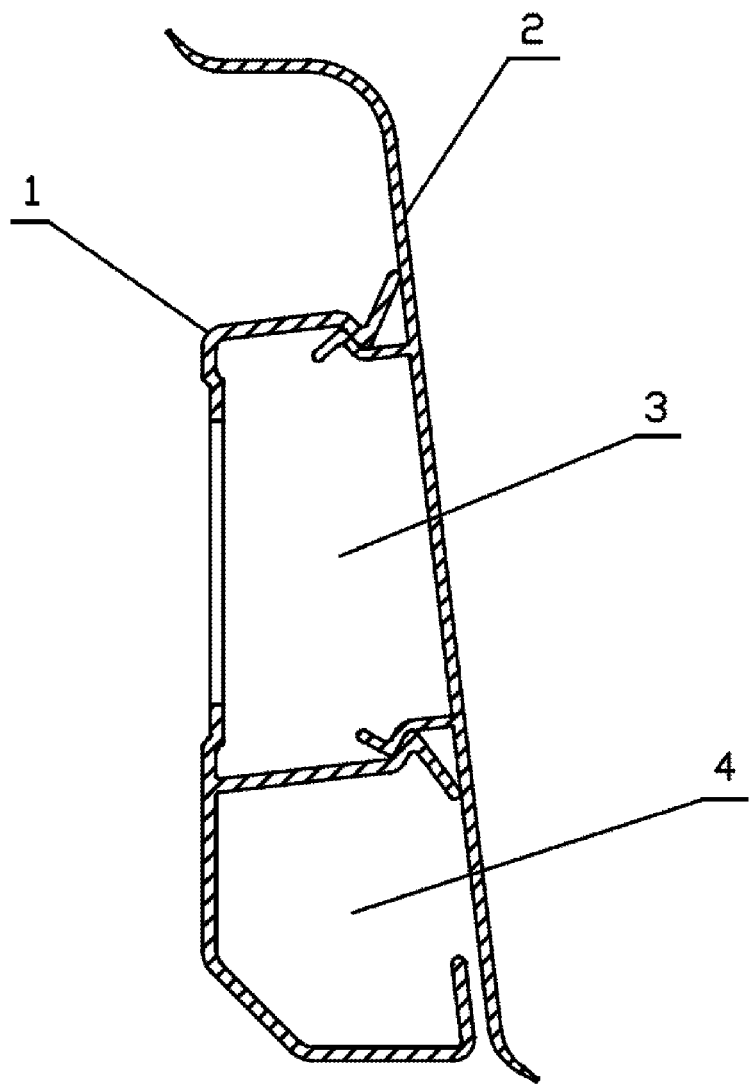
Figure 4:
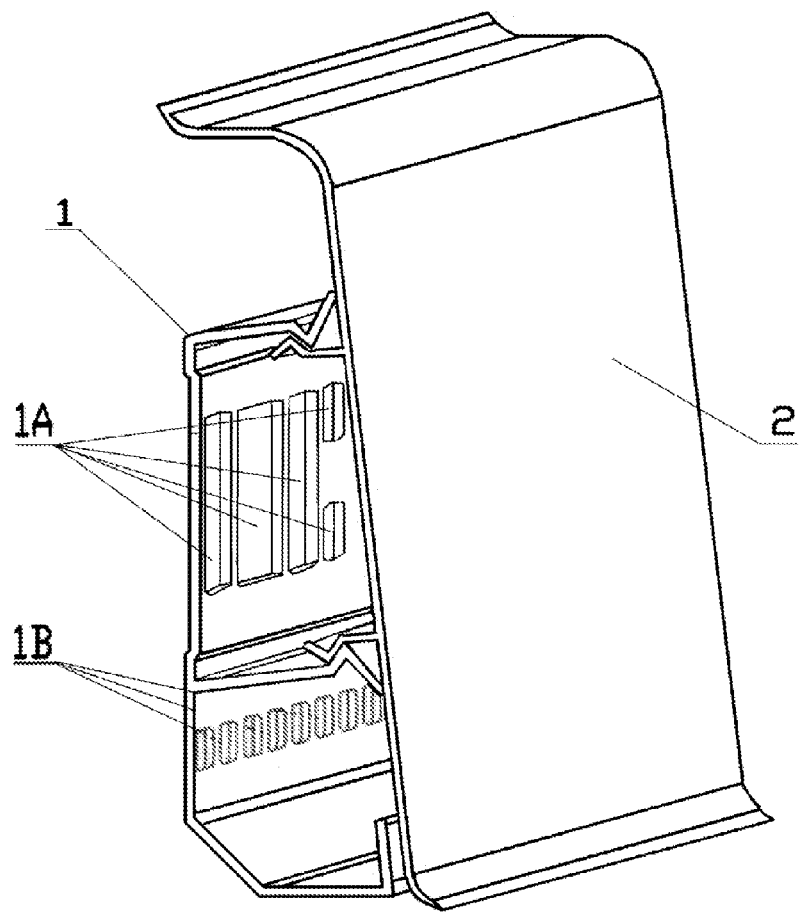

The baseboard is composed of a mounting part 1 and a cover part 2 connected by a snap-connection. The mounting part 1 is constituted by a profile in the form of a flat board, with a bottom shelf 1D, a middle shelf 1S and a top shelf 1G expanding from its surface in the same direction, while the end of the bottom shelf 1D is bent out towards the middle shelf 1S. The middle shelf 1S is bent in a small part of its width towards the top shelf 1G and then, in a slightly larger part of its width, the middle shelf 1S is bent towards the bottom shelf 1D. The top shelf 1G is bent in a small part of its width towards the middle shelf 1S, and then, in a slightly larger part of its width, the top shelf 1G is bent out upwards. The cover section 2 is constituted by a profile in the form of a board, with a cross-section resembling a flipped "L" with small sections of shelves 2F1 and 2F2 bent outwards. A bottom shelf 2D and a top shelf 2G expand in the same direction from the central part of the cover part's 2 surface. The bottom shelf 2D is bent out downwards in a small part of its width and then, in a slightly larger part of its width, the bottom shelf 2D is bent towards the top shelf 2G. The top shelf 2G is bent out upwards in a small part of its width and then, in a slightly larger part of its width, the top shelf 2G is bent towards the bottom shelf 2G. The external surfaces of the bent sections of the ends of the bottom shelf 2D and of the top shelf 2G form a flexible lock by abutting to the internal surfaces of the bent sections of the ends of the middle shelf 1S and of the top shelf 1G, besides, the elements of the mounting part 1 and the elements of the cover part 2 form a top chamber 3 and a bottom chamber 4. The wall of the mounting part 1 has a repeating series of holes with various sizes and outlines in the width between the middle shelf 1S and the top shelf 1G, the series forming the first openwork 1A. The wall of the mounting part 1 has a series of holes in the width between the middle shelf 1S and the bottom shelf 1D, the series forming the second openwork 1B. The end of the bottom shelf 1D bent out towards the middle shelf 1S is located in a plane parallel to the plane of the surface of the cover part 2.

The invention claimed is:
1. A baseboard, comprising:
a mounting part; and
a cover part,
wherein the mounting part and the cover part are connected by a snap-connection, with walls forming internal installation chambers,
wherein the mounting part has a profile with the form of a flat board with a bottom shelf, a middle shelf and a top shelf expanding in a same direction from a surface of the mounting part, with an end of the bottom shelf bent towards the middle shelf,
wherein the middle shelf is bent, in a first part of a width of the middle shelf, towards the top shelf,
wherein, in a second part of the width of the middle shelf, the second part being larger than the first part, the middle shelf is bent towards the bottom shelf,
wherein the first part of the middle shelf is also angled toward the second part, the second part of the middle shelf is also angled toward the first part and further, the first and second parts of the middle shelf meet at an apex portion of the middle shelf,
wherein the top shelf is bent, in a first part of a width of the top shelf, towards the middle shelf,
wherein, in a second part of the width of the top shelf, the second part being larger than the first part, the top shelf is bent out upwards,
wherein the cover part has a profile with the form of the board, with a cross-section having a shape substantially similar to a flipped "L" with sections of shelves bent outwards,
wherein a cover part bottom shelf and a cover part top shelf expand in a same direction from a central section of a surface of the cover part,
wherein the cover part bottom shelf is bent out downwards in a first part of a width of the cover part bottom shelf, and, in a second part of the width of the cover part bottom shelf, the second part being larger than the first part, the cover part bottom shelf is bent towards the cover part top shelf,
wherein the cover part top shelf is bent out upwards in a first part of a width of the cover part top shelf, and, in a second part of the width of the cover part top shelf, the second part being larger than the first part, the cover part top shelf is bent towards the cover part bottom shelf,
wherein external surfaces of the bent sections of ends of the cover part bottom shelf and of the cover part top shelf form a flexible lock by abutting to internal surfaces of the bent sections of ends of the middle shelf and of the top shelf, and
wherein elements of the mounting part and elements of the cover part form a top chamber and a bottom chamber.

2. The baseboard according to claim 1, wherein at least one of the walls of the mounting part has a repeating series of holes with various sizes and outlines in a width between the middle shelf and the top shelf, the series forming a first openwork.

3. The baseboard according to claim 2, wherein the at least one of the walls of the mounting part has a repeating series of holes with various sizes and outlines in a width between the middle shelf and the bottom shelf, the series forming a second openwork.

4. The baseboard according to claim 3, wherein the end of the bottom shelf bent out towards the middle shelf is located in a plane parallel to the plane of the surface of the cover part.

* * * * *